Oct. 21, 1952

P. A. CARUSO 2,614,484

RETAINER FOR VEGETABLES AND LIKE
PRODUCTS WHILE COOKING THE SAME

Filed Jan. 9, 1950

2 SHEETS—SHEET 1

INVENTOR.
PHILIP A. CARUSO
BY Edward C. Healy
ATTORNEY

Patented Oct. 21, 1952

2,614,484

UNITED STATES PATENT OFFICE 2,614,484

RETAINER FOR VEGETABLES AND LIKE PRODUCTS WHILE COOKING THE SAME

Philip A. Caruso, San Carlos, Calif., assignor of one-half to Daniel Snow, South San Francisco, Calif.

Application January 9, 1950, Serial No. 137,550

1 Claim. (Cl. 99—403)

This invention relates to improvements in kitchen utensils and has particular reference to an appliance adapted for use in a fluid holding container to retain vegetables to be cooked, preferably by boiling, in a submerged condition or state during the boiling action of the fluid in the container, to thus preserve the appearance and natural taste and color of the boiled products.

The principal objects of the invention are the provision of a portable appliance adapted to be detachably secured within the fluid holding container, the provision of collapsible handle means for manipulating the container and the provision of extensional arms adapted to lock and hold the appliance within the fluid of the container to thus retain the vegetables in a position submerged below the water level.

A further object of the invention is the production of an appliance of the character described that is simple in construction, economical to manufacture, positive in operation and highly serviceable in use.

Other objects and advantages will be apparent during the course of the following description.

Figure 1:
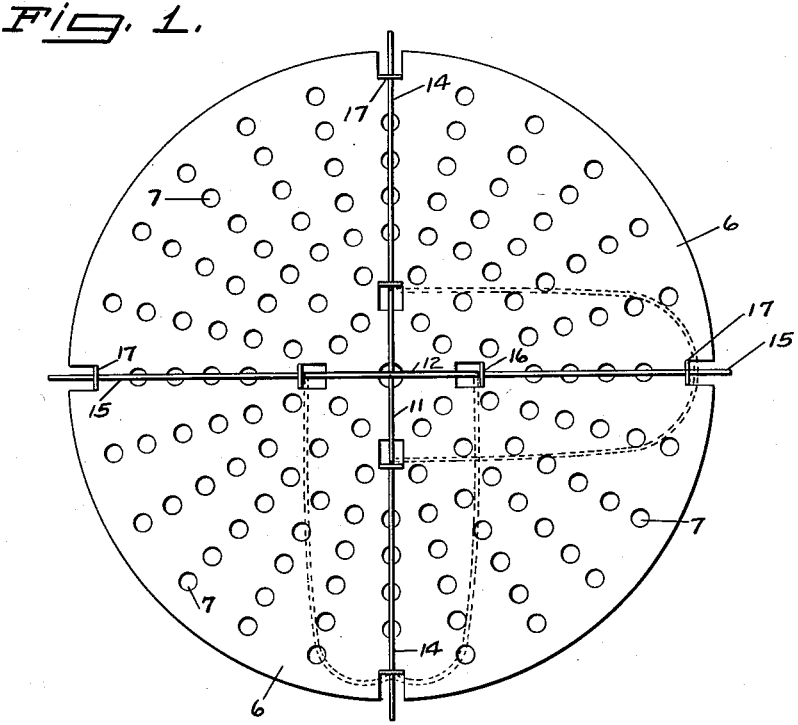
Figure 2:
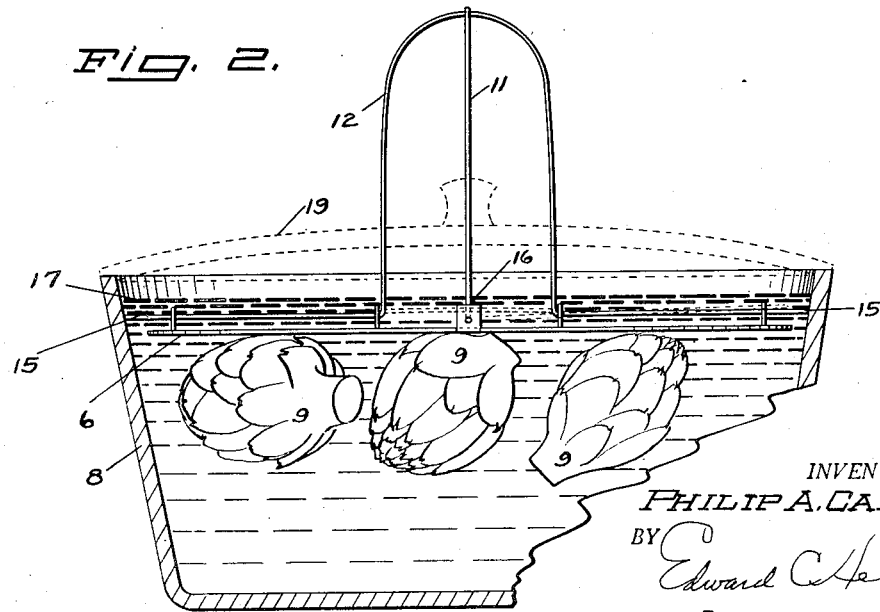
Figure 3:
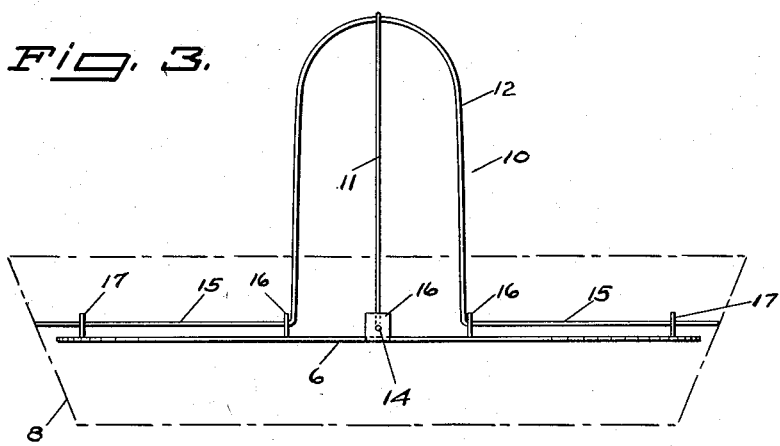
Figure 4:
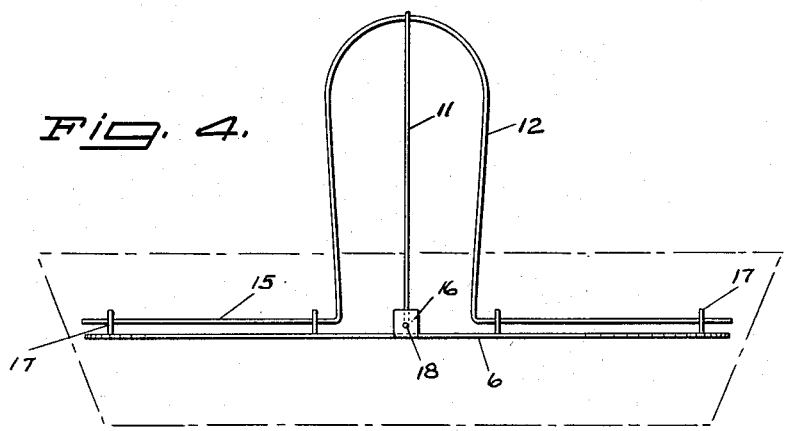
Figure 5:
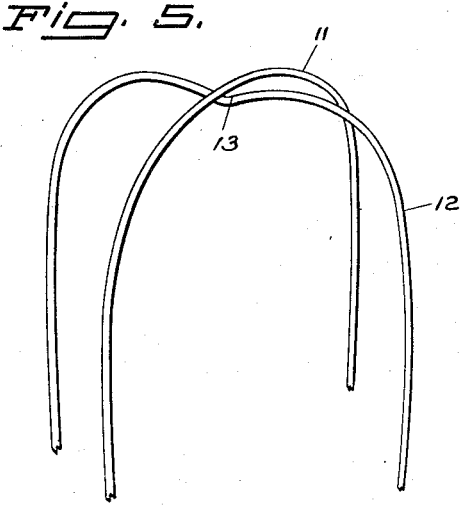

In the accompanying drawing forming a part of this specification and in which like numerals are employed to designate like parts throughout the same, Fig. 1 is a top plan view of the perforated plate of the appliance and disclosing to advantage the handle of the appliance in full lines when in an operative position, and in dotted lines when in an inoperative position, Fig. 2 is a fragmentary cross-sectional view of the container, such as in this instance a kettle in which artichokes are being cooked, and in said view I have disclosed in dotted lines a cover for the container that is employed when the handle of Fig. 1 is collapsed to allow the cover to be placed on the open end of the container, Fig. 3 is a side elevational view that discloses to advantage the construction of the handle and the arms in an extended position, Fig. 4 is a similar view of the arms in a retracted position, and Fig. 5 is a fragmentary perspective view of the upper elements of the handle.

It is a well known fact that vegetables, such as artichokes, string beans and various vegetables of this category, when subjected to a boiling action are frequently discolored after they arise above the surface of the water level of the container. Frequently the said vegetables are discolored by blackness in their appearance that detracts from the vegetables and thus renders the same objectionable to view. To overcome these disadvantages, I have devised the following invention.

In the accompanying drawings wherein for the purpose of illustration is shown the preferred embodiment of my invention, the numeral 6 designates a circular flat metal plate that is provided with a plurality of spaced perforations 7 therein. This plate, as disclosed to advantage in Fig. 2, is submerged below the water level of a fluid holding container, such as a boiler 8, in order that vegetables of the nature of artichokes, string beans and the like, as indicated by the numeral 9, may be submerged below the water level during the cooking operation.

In Figs. 3, 4 and 5, I have disclosed to advantage a handle construction that is designated as a whole by the numeral 10. The handle construction comprises a pair of arcuate spring metal bars 11 and 12, the later being equipped with a central depression 13 capable of receiving therein the medial portion of the bar 11. Integrally formed with the bars 11 and 12 are a pair of horizontal arms 14 and 15 respectively, that are held and guided in an operative and in an inoperative position by spaced upstanding ears 16 and 17 that are struck from the metallic plate 6. The ears 16 are formed on the medial portion of the plate 6 while the ears 17 are formed adjacent the outer periphery of the plate 6.

It will be noted that the respective ears are apertured as at 18 to permit the passage therethrough of said arms when under the influence of manual operation that are retracted or extended as disclosed to advantage in Figs. 3 and 4. When in an extended position the extremities of the arms will contact the inner periphery of the container 8 and thus the perforated plate 6 will be retained in a fixed position to prevent displacement of the same from the container. A manual gripping of the handles by the palm of the hand of the operator will cause the arms to retract, as illustrated in Fig. 4. In Fig. 1 I have shown the dotted line position the arms assume when the bar 11 is detached from its normal upright position. The bars 11 and 12 will then assume a position in parallelism with the plate 6. The bars are collapsed, as illustrated in Fig. 1, when it is desired to place a cover 19 on the receptacle 8. In either instance, whether the handles are extended upwardly or collapsed, the plate 6 will by the force of gravity and slight pressure on the vegetables, effect a complete submerging of the vegetables and will prevent the same from floating above the water level of the boiling fluid in the container.

From the foregoing description considered in connection with the accompanying drawing, it will be obvious that I have devised a most unique and practical utensil wherein the various objects of the invention can be readily accomplished.

It is to be understood that the form of my invention herewith shown and described is to be taken as a preferred example of the same and that various changes relative to the shape, size, material and arrangement of parts may be resorted to without departing from the spirit of the invention or the scope of the sub-joined claim.

Having thus described my invention, I claim:

A device for retaining vegetables and the like submerged in a cooking vessel during the boiling of the products, comprising a perforated plate adapted to be positioned within the vessel and above the boiling products, a pair of upwardly extending spring metal handle members providing a hand hold for said plate, a pair of integrally formed horizontal arms provided on said handle members, one of said handle members having a central depression for receiving and for retaining therein the medial portion of the other of said handle members, the said handle members and arms being connected to said plate, the latter connecting means comprising upwardly extending apertured ears provided on said plate for guiding the arms into an extensible and retractible position relative to said plate, the extremities of said arms adapted to lock and unlock said plate relative to the inner periphery of the cooking vessel.

PHILIP A. CARUSO.

REFERENCES CITED

The following references are of record in the file of this patent:

UNITED STATES PATENTS

| Number | Name | Date |
|---|---|---|
| 148,130 | Moore | Mar. 3, 1874 |
| 420,491 | Bryant | Feb. 4, 1890 |
| 639,474 | Welty | Dec. 19, 1899 |
| 814,714 | Longhenry | Mar. 13, 1906 |
| 924,981 | Gwinn | June 15, 1909 |
| 961,474 | Allsopp | June 14, 1910 |
| 967,211 | Long | Aug. 16, 1910 |
| 1,411,093 | Harrington | Mar. 28, 1922 |
| 1,718,624 | Baker | June 25, 1929 |
| 1,818,924 | Basmadjian | Aug. 11, 1931 |

FOREIGN PATENTS

| Number | Country | Date |
|---|---|---|
| 259,783 | Great Britain | Oct. 21, 1926 |